United States Patent
Takenoiri et al.

(10) Patent No.: US 7,332,194 B2
(45) Date of Patent: Feb. 19, 2008

(54) PERPENDICULAR MAGNETIC RECORDING MEDIUM AND METHOD OF MANUFACTURING THEREOF

(75) Inventors: Shunji Takenoiri, Nagano (JP); Yasushi Sakai, Nagano (JP)

(73) Assignee: Fuji Electric Device Technology Co., Ltd. (JP)

( * ) Notice: Subject to any disclaimer, the term of this patent is extended or adjusted under 35 U.S.C. 154(b) by 358 days.

(21) Appl. No.: 10/850,058

(22) Filed: May 20, 2004

(65) Prior Publication Data

US 2005/0014029 A1 Jan. 20, 2005

(30) Foreign Application Priority Data

May 20, 2003 (JP) ............................. 2003-142650
Mar. 11, 2004 (JP) ............................. 2004-069086

(51) Int. Cl.
*B05D 5/12* (2006.01)

(52) U.S. Cl. ...................... 427/127; 427/128; 427/131; 427/132; 428/835.6

(58) Field of Classification Search ................ 427/127, 427/128, 131, 132; 428/611, 662, 663, 680, 428/835.6
See application file for complete search history.

(56) References Cited

U.S. PATENT DOCUMENTS

| | | | |
|---|---|---|---|
| 4,632,883 A * | 12/1986 | Howard et al. | 428/611 |
| 6,858,320 B2 * | 2/2005 | Takenoiri et al. | 428/611 |
| 2002/0127433 A1 * | 9/2002 | Shimizu et al. | 428/694 TM |
| 2003/0035235 A1 * | 2/2003 | Ikeda et al. | 360/59 |
| 2003/0099869 A1 | 5/2003 | Oikawa et al. | |
| 2003/0152809 A1 * | 8/2003 | Oikawa et al. | 428/694 TS |

(Continued)

FOREIGN PATENT DOCUMENTS

JP 1-285022 A 11/1989

(Continued)

OTHER PUBLICATIONS

T. Oikawa et al.; "Microstructure and Magnetic Properties of CoPtCr-SiO$_2$ Perpendicular Recording Media", IEEE Transactions on Magnetics, vol. 38, No. 5; Sep. 2002; pp. 1976-1978.

(Continued)

*Primary Examiner*—Alain L. Bashore
(74) *Attorney, Agent, or Firm*—Rossi, Kimms & McDowell LLP

(57) ABSTRACT

A perpendicular magnetic recording medium is disclosed that is characterized by a lowered noise component and improved thermal stability. The method for making the recording medium includes the serial steps of forming a soft magnetic back-lining layer on a non-magnetic substrate, forming an intermediate layer on the soft magnetic back-lining layer, forming a magnetic recording layer on the intermediate layer, and forming a protective film and then a liquid lubricating layer on the magnetic recording layer. Thermal treatment is executed after the formation of the magnetic recording layer and before the formation of the protective film, or after the formation of the protective film and before the formation of the liquid lubricating layer. The thermal-processing steps are is executed in a vacuum higher than about 0.1 Pa and in a thermal environment within a range from about 200° C. to about 250° C. for a period of less than about 60 seconds.

10 Claims, 5 Drawing Sheets

U.S. PATENT DOCUMENTS

2004/0106010 A1* 6/2004 Iwasaki et al. .......... 428/694 T
2006/0199043 A1* 9/2006 Sugimoto et al. ........ 428/828.1

FOREIGN PATENT DOCUMENTS

| JP | 2000-306228 | 11/2000 |
| --- | --- | --- |
| JP | 2000-311329 | 11/2000 |
| JP | 2002-358617 | 12/2002 |
| JP | 2002-367163 | 12/2002 |
| JP | 2003-036530 A | 2/2003 |
| JP | 2003-036531 A | 2/2003 |
| JP | 2003-123234 | 4/2003 |

OTHER PUBLICATIONS

S. Oikawa et al.; "High Performance CoPtCrO Single Layered Perpendicular Media with No Recording Demagnetization"; IEEE Transactions on Magnetics, vol. 36, No. 5; Sep. 2000; pp. 2393-2395.

Relevant Portion of Austrian Search Report for corresponding Austrian Patent Application No. 200402601-9, mailed Jan. 12, 2007.

* cited by examiner

PERPENDICULAR MAGNETIC RECORDING MEDIUM AND METHOD OF MANUFACTURING THEREOF

CROSS REFERENCE TO RELATED APPLICATIONS

This application claims priority from application Serial No. JP PA 2003-142650, filed on May 20, 2003, and JP PA 2004-69086, filed on Mar. 11, 2004, and the contents of these two documents are incorporated herein by reference in their entirety.

BACKGROUND OF THE INVENTION

A. Field of the Invention

The present invention relates to a novel perpendicular magnetic recording medium to be loaded on a variety of magnetic recording apparatuses and a novel method of manufacturing the perpendicular magnetic recording medium according to the present invention.

B. Description of the Related Art

Perpendicular magnetic recording technology has recently attracted a great deal of attention from concerned parties as a practical technology for realizing a magnetic recording process with higher density, in place of the conventional longitudinal magnetic recording format.

Basically, any of the perpendicular magnetic recording media comprises the following: a magnetic recording layer made from a hard magnetic material, an underlayer for orienting the magnetic recording layer in a specified direction, a protective film for protecting the upper surface of the magnetic recording layer, and a back-lining layer made from a soft magnetic material, which functions to concentrate the magnetic flux generated by a magnetic head used for executing a recording process onto the magnetic recording layer.

It has been a conventional practice to mainly apply a variety of alloys comprising CoCrPt, CoCrTa, or the like as the material for constituting a magnetic recording layer to be used for a perpendicular medium. When any of these alloys is used, since chromium (Cr) is a non-magnetic material it segregates itself within the grain boundary, and individual grains are magnetically dissociated from each other. This generates specific physical characteristics in terms of the high coercive force (Hc) essentially required for the magnetic recording medium. Segregation of chromium toward grain boundaries has thus been facilitated by devising a process for forming a film used for the longitudinal medium by heating it or adding bias to a substrate. Nevertheless, as in the case of treating the longitudinal medium, even after applying a heating process or adding bias to the substrate, the actual amount of the segregated chromium component remains negligible in the case of processing the perpendicular medium. This in turn increases the occurrence of a noise component therein, resulting in a problem.

To solve this problem, a magnetic recording layer comprising an alloy of CoPtCrO that is capable of facilitating magnetic dissociation of grains by causing oxide to be segregated into grain boundaries has been proposed (see S. Oikawa et al. "High performance CoPtCrO single-layered perpendicular media with no recording demagnetization," *IEEE Trans. Magn*, Vol. 36, pp. 2393-2395, 2000). In addition, a further proposal has been made of a granular medium applied with a magnetic recording layer made from an alloy of $CoCrPt-SiO_2$ (see T. Oikawa, et al. "Microstructure and Magnetic Properties of $CoPtCr-SiO_2$ Perpendicular Recording Media," *IEEE Trans. Magn*, Vol. 38, pp. 1976-1978, 2002).

For example, when a granular film comprising an alloy of $CoCrPt-SiO_2$ is formed, a segregation process is advanced by causing the $SiO_2$ component to surround the periphery of grains made from the alloy of CoCrPt, thereby causing individual grains of the CoCrPt alloy to be dissociated magnetically. Thus, in the case of forming the granular film, instead of applying phase separation (separation of magnetic phases) of the above-mentioned alloy material, an insoluble amorphous material such as oxide or nitride is added to a specific alloy material.

According to the report from the above-mentioned document, it was confirmed that, unlike the case of a conventional recording medium comprising a magnetic recording layer made from a CoCr alloy component, the above granular medium proved to have reduced the occurrence of noise components in itself. This granular medium thus shows the promise of generating significant future demand.

On the other hand, in the case of forming the granular film by heating its substrate, oxidation or nitrification of the Co component or intermingling the phase of alloy components with the phase of non-magnetic alloy components may cause a problem. To prevent this, the granular film must be formed with no pre-heating process. However, when the granular film is formed without heating, noise components cannot be fully eliminated from the granular medium because of insufficient dissociation between the phases of alloy components and non-magnetic alloy components. Further, another problem is that the uniaxial anisotropy constant (Ku) value of the granular film is lowered by the generation of stacking faults in the alloy phase, which eventually results in total loss of thermal stability.

A method of forming a magnetic recording layer (or a protective film) without applying any thermal treatment and then subsequently thermally treating the granular film at high temperatures ranging from 400° C. to 600° C. after the layer or film has been formed has been practiced to solve the above problems. For example, Laid-Open Japanese Patent Publication No. 2000-306228 proposes that by providing thermal treatment at a minimum of 400° C. for a duration ranging from 5 minutes to 60 minutes (or according to Laid-Open Japanese Patent Publication No. 2000-311329), at 250° C. to 500° C. for a duration of 0.1 to 10 hours), it is possible to secure a granular medium capable of executing a magnetic recording operation with high density through sufficient dissociation between the non-magnetic matrix material and magnetic grains contained in the granular medium. However, inasmuch as either of the above techniques requires thermal treatment at very high temperatures for long periods, neither of them is feasible for mass production of the granular medium.

The inventors of the present invention have thus far reported that it is possible to improve the orientation characteristics of a magnetic recording layer, decrease the initially grown layer in the magnetic recording layer, and reduce grain size by forming a ground layer comprising a material made from soft magnetic permalloy and applying Ru or a Ru-based alloy for constituting a non-magnetic intermediate layer, thereby enabling the acquisition of a novel medium incorporating outstanding magnetic characteristics and read-write performances (according to the Laid-Open Japanese Patent Publication No. 2002-358617, No. 2003-123234, and No. 2002-367160).

The present invention is directed to overcoming or at least reducing the effects of one or more of the problems set forth above.

SUMMARY OF THE INVENTION

It is an object of the present invention to reduce the noise component by facilitating the segregation of non-magnetic material in the magnetic recording layer, and also by improving thermal stability by increasing the uniaxial anisotropic constant (Ku) value beyond that specified in Laid-Open Japanese Patent Publication No. 2002-358617, No. 2003-123234, and No. 2002-367160.

It is a further object of the invention to provide a novel perpendicular magnetic recording medium that is capable of improving the physical performance characteristics required to further decrease the noise component and improve thermal stability in the granular perpendicular magnetic recording medium comprising magnetic grain dispersion in the matrix of non-magnetic oxide or non-magnetic nitride.

These and other objects according to the invention are provided by a method of manufacturing a perpendicular magnetic recording medium comprising, in order, forming a soft magnetic back-lining layer on a non-magnetic substrate, forming an intermediate layer comprising Ru or Ru-based alloy on said soft magnetic back-lining layer, forming a magnetic recording layer incorporating a granular structure on said intermediate layer, wherein said granular structure is formed by the dispersion of magnetic grains in a matrix of non-magnetic oxide or non-magnetic nitride, forming a protective film on said magnetic recording layer, and forming a liquid lubricating layer on said protective film, wherein a thermal treatment is performed in an atmosphere ranging in temperature from about 200° C. to about 250° C. for no longer than 60 seconds under a vacuum higher than about 0.1 Pa either (i) after forming said magnetic recording layer and before forming said protective film, or (ii) after forming said protective film and before the forming said liquid lubricating layer. The thermal treatment preferably is executed for a duration ranging from one second to 15 seconds.

In one embodiment, a seed layer is formed on the soft magnetic back-lining layer by applying a material selected from any type among Ta, Zr, $Ni_3Al$, and a Ta-based alloy, and then the intermediate layer is formed after executing the seed-layer forming process. An underlayer comprising a material made from soft magnetic permalloy may be formed on the seed layer; and then the intermediate layer would be formed after the execution of said process for forming the underlayer.

When the e seed layer is formed using a Ta-based alloy, preferably a material selected from the group consisting of Cr, Mo, and W is added in an amount of about 1 at % to about 60 at % to the tantalum component.

A perpendicular magnetic recording medium manufactured by any of the foregoing methods of manufacture also is provided in accordance with the present invention.

BRIEF DESCRIPTION OF THE DRAWINGS

The foregoing advantages and features of the invention will become apparent upon reference to the following detailed description and the accompanying drawings, of which.

DETAILED DESCRIPTION OF SPECIFIC EMBODIMENTS

Figure 1:
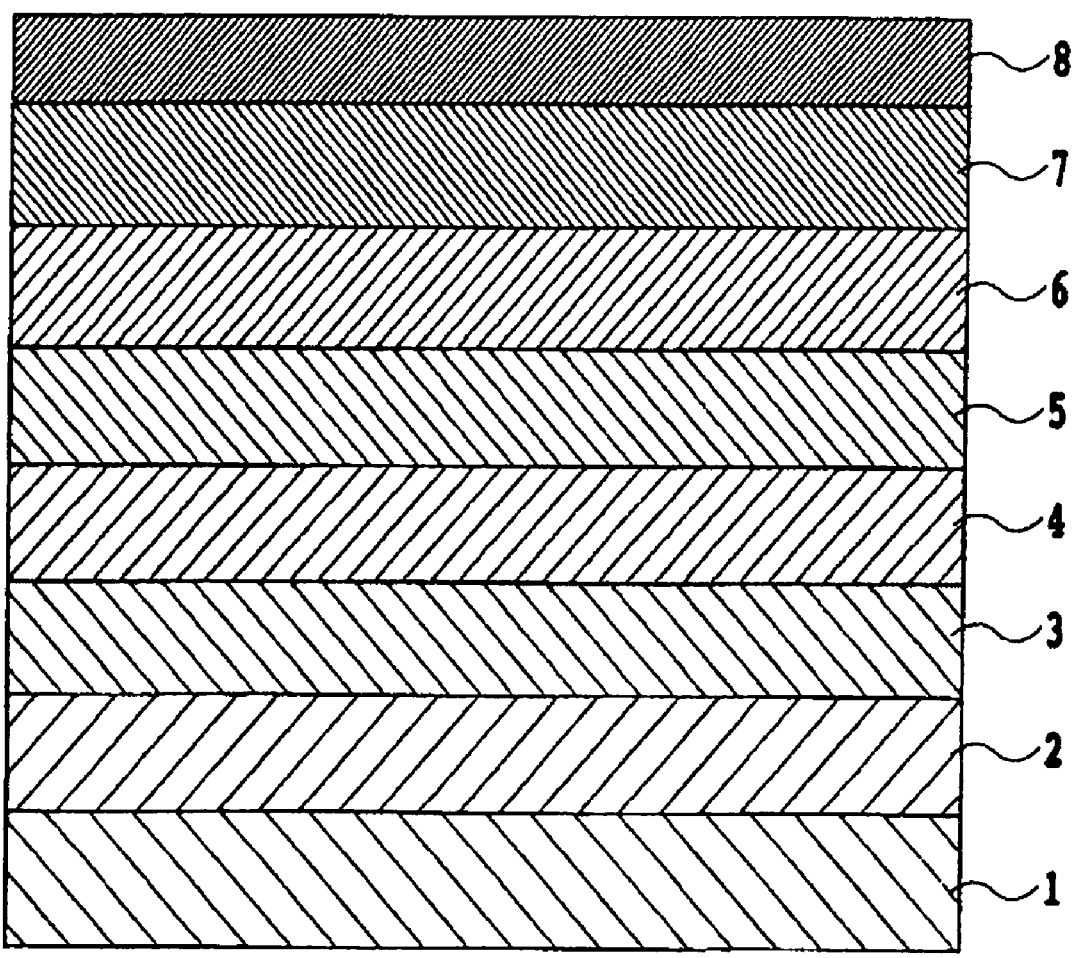
FIG. 1 is a cross-sectional schematic view of the perpendicular double-layer recording medium according to the present invention.

The present inventors determined after repeated experimental studies that it is possible simultaneously to realize further reduction in the noise component from the granular magnetic recording medium and further improvement in the thermal stability thereof via the execution of a short-term thermal treatment immediately after film formation of a magnetic recording layer or a protective film at a relatively low temperature (maximum of about 250° C.) for no longer than about 60 seconds in a vacuum higher than about 0.1 Pa.

Provision of a vacuum of higher than about 0.1 Pa prevents oxidation of the granular magnetic recording medium in the course of thermal treatment. Further, experimental results obtained by the inventors have clearly demonstrated that the magnitude of the noise component present in the media prepared by other processes described above had been increased through the growth of grains present in the granular magnetic recording layer as a result of executing a thermal treatment at a temperature higher than 250° C. To prevent this, thermal treatment was executed at a temperature below about 250° C. in the final stage of the above thermal treatment. Likewise, in order to suppress growth of the grains of the magnetic recording layer, it was also essential to limit the duration of the thermal treatment to about 60 seconds or less.

In the case of the processing an aluminum substrate plated with the most commonly-used alloy compound comprising Ni and P components, it is known that the Ni—P compound is subject to crystallization at a minimum of 250° C. when exposed to thermal treatment for an extended period. The Ni—P compound also is crystallized by a short-term thermal treatment of several seconds at a temperature close to 300° C. Consequently, surface roughness of the Ni—P compound increases, thereby failing to provide the substrate of the magnetic recording medium with a smooth surface that is appropriate for practical use. On the other hand, in accordance with the teachings of the present invention, the above conventional Ni—P plating compound can provide an inexpensive aluminum substrate after thermal treatment at a maximum of about 250° C. for no longer than about 60 seconds, thereby contributing to cost reductions.

It was further determined that the practical effect of improving the physical characteristics of the above magnetic recording medium through thermal treatment was further enhanced by inserting a seed layer comprising any specific material selected from among Ta, Zr, $Ni_3Al$, and a Ta-based alloy between a soft magnetic back-lining layer and an underlayer made from permalloy. The Ta-based alloy includes a minimum of about 1 at % and a maximum of about 60 at % of any material selected from among Cr, Mo, and W. Insertion of the seed layer prevents the physical characteristics of the above magnetic recording medium from being compromised by slight mutual diffusion between the soft magnetic back-lining layer and the permalloy-based underlayer while thermal treatment is underway.

The novel magnetic recording medium according to the present invention features the provision of multiple functional layers serially laminated on a non-magnetic substrate, which comprise a soft magnetic back-lining layer, an intermediate layer comprising Ru or a Ru-based alloy, a magnetic recording layer, a protective film, and a liquid lubricating layer. Immediately after formation of the magnetic recording layer or the protective film, the manufacturing method according to the present invention executes a short-term thermal treatment process under vacuum condition higher than about 0.1 Pa and at a relatively low temperature at a maximum of about 250° C. for a period of less than about 60 seconds.

In addition to the thermal treatment process, it is preferred that the orientation characteristics and crystallization characteristics of the magnetic recording layer be improved, and that the actual effect resulting from improvement of the physical characteristics through thermal treatment be further enhanced by initially forming a seed layer comprising any material selected from among Ta, Zr, $Ni_3Al$, and a Ta-based alloy, wherein the seed layer is disposed on the soft magnetic back-lining layer and the permalloy-based underlayer is disposed immediately above the soft magnetic back-lining layer. The Ta-based alloy includes a minimum of about 1 at % and a maximum of about 60 at % of any material selected from among Cr, Mo, and W.

The novel perpendicular magnetic recording medium and the method of manufacturing this medium according to the present invention make possible to further increase the coercive force of the recording medium, further lower the noise component of the recording medium, and further enhance SIN ratio, thereby further improving magnetic recording density. The medium is a granular medium requiring the provision of layer films not provided with a pre-heating process, and is formed by performing a short-term thermal treatment at a relatively low temperature, specifically a maximum of about 250° C. for no longer than about 60 seconds, under a vacuum higher than about 0.1 Pa, at the stage after the formation of a magnetic recording layer and before the formation of a protective film, or after the formation of the protective film and before the formation of a liquid lubricating layer. Further, the above arrangement has made it possible to improve the thermal stability of the magnetic recording layer, further enhancing the reliability of the magnetic recording medium.

A preferred method of implementing the present invention is described below. FIG. 1 is a schematic diagram of a perpendicular magnetic recording medium according to one of the practical forms for implementing the present invention. As shown in FIG. 1, the novel perpendicular magnetic recording medium comprises the following: non-magnetic substrate 1, soft magnetic back-lining layer 2, seed layer 3, soft magnetic permalloy-series underlayer 4, intermediate layer 5 comprising Ru or a Ru-based alloy, magnetic recording layer 6, protective film 7, and liquid lubricating layer 8 that are serially laminated on the non-magnetic substrate 1.

Non-magnetic substrate 1 may comprise any substrate provided with a smooth surface. For example, suitable substrates include a Ni—P plated aluminum alloy, a piece of reinforced glass sheet, a piece of crystalline glass, or the like that is used for a magnetic recording medium.

It is allowable to form soft magnetic back-lining layer 2 by specifically applying crystallized FeTaC, alloy comprising FeSiAl (corresponding to a commercial product called Sendust), or CoZrNb and CoTaZr comprising an amorphous Co alloy, for example. The optimal value of the film thickness of soft magnetic back-lining layer 2 is variable by the constitution and physical characteristics of the magnetic head of a corresponding magnetic recording apparatus (not shown) used to perform a magnetic recording operation. However, in terms of productivity, it is preferred that soft magnetic back-lining layer 2 be provided with a film thickness ranging from 100 nm to 500 nm.

To constitute seed layer 3, it is defined that a specific material selected from among Ta, Zr, $Ni_3Al$, and a Ta-based alloy to which is added a minimum of about 1 at % and a maximum of about 60 at % of any material selected from among Cr, Mo, or W is solely applied. Inasmuch as seed layer 3 is non-magnetic, in order to enable the magnetic field generated by a magnetic head to be effectively concentrated onto soft magnetic back-lining layer 2, it is preferred that the thinner the film thickness, the greater the practical effect. Nevertheless, in order to prevent soft magnetic back-lining layer 2 and soft magnetic permalloy-based underlayer 4 from mutually diffusing during a thermal treatment, a certain film thickness is required. For this reason, it is preferred that seed layer 3 be provided with a film thickness ranging from about 1 nm to 15 nm. Further, although the performances of the magnetic recording medium can be improved by providing thermal treatment even when seed layer 3 is dispensed with, provision of seed layer 3 enhances the practical effect.

Underlayer 4 may be constituted by applying any of the following soft-magnetic permalloy-series materials: NiFeAl, NiFeSi, NiFeNb, NiFeB, NiFeNbB, NiFeMo, and NiFeCr, for example. It is desired that the film thickness of underlayer 4 made from soft magnetic permalloy be properly adjusted so that the magnetic characteristics and read-write performance of the magnetic recording layer 6 can be optimized. However, in light of the relationship between performance of a medium and productivity, it is desired that underlayer 4 be provided with a film thickness ranging from about 3 nm to 50 nm.

Intermediate layer 5 is formed by solely applying Ru or a Ru-based alloy, to the Ru component of which is added more than one type of material selected from a group comprising C, Cu, W, Mo, Cr, Ir, Pt, Re, Rh, Ta, and V. When the Ru component or the Ru-based alloy is disposed on underlayer 4, either of these elements provides satisfactory orientation characteristics, and yet the grain size decreases. Further, either of these elements is satisfactory in terms of its junction characteristics and decreases the thickness of the initial layer of magnetic recording layer 6. In order to realize high-density recording capability, it is essential that the film thickness of the Ru component or the Ru-based intermediate layer 5 be made as thin as possible within a critical limit that does not degrade the magnetic characteristics or read-write performances of magnetic recording layer 6. Specifically, it is desired that the intermediate layer 5 be provided with a film thickness ranging from about 1 nm to 20 nm.

Magnetic recording layer 6 is suitably constituted by applying ferro-magnetic alloy comprising at least a Co component and Cr component, wherein the disposition of its c-axis consisting of a hexagonal close packed structure in the direction perpendicular to the film surface is required to enable the c-axis to function as the perpendicular magnetic recording medium. Any granular materials may be used to constitute the magnetic recording layer 6, including the following: CoPt—SiO$_2$, CoCrPtO, CoCrPt—SiO$_2$, CoCrPt—Al$_2$O$_3$, CoPt—AlN, CoCrPt—Si$_3$N$_4$, or the like. However, the practically applicable scope of the granular materials is not solely limited to those cited above.

Protective film 7 is constituted by applying a thin film mainly comprising carbon, for example. In addition, it is also allowable to apply a variety of common thin films normally used as a protective film to protect the magnetic recording media.

It is possible for liquid lubricating layer 8 to use any lubricant, for example, perfluoropolyether. Further, it is also possible to apply a variety of lubricants commonly used as materials for constituting a liquid lubricating layer for a magnetic recording medium.

It is possible to form individual layers subject to lamination on non-magnetic substrate 1 by applying a variety of film-forming technologies normally applied to the magnetic recording media. In order to form individual layers, except for the liquid lubricating layer, it is practicable to apply the DC magnetron sputtering method, the RF magnetron sputtering method, or the vacuum evaporation method. Further, it is also practicable to apply the dipping method or the spin-coating method for composing the liquid lubricating layer. However, the practically applicable technologies are not solely limited to those cited above.

Next, the method of executing thermal treatment is described below. The thermal treatment is executed in the vacuum phase at a minimum of about 0.1 Pa immediately after formation of magnetic recording layer 6 or immediately after formation of protective film 7. The practical peak temperature is defined as a maximum of about 250° C. for no longer than about 60 seconds. Preferably, in order to ensure compatibility between the practical effect of the thermal treatment and productivity, it is desired that the applicable temperature should be defined as a minimum of about 200° C. and a maximum of about 250° C., and the applicable duration from about one second to about 15 seconds.

Further details of the novel perpendicular magnetic recording medium according to the present invention are given below. It should be understood that the scope of the present invention is not solely limited to the Examples given below. The essential components of the present invention are subject to various changes or modifications within a scope that does not deviate from the essentials of the present invention.

EXAMPLE 1

This example relates to a perpendicular magnetic recording medium comprising the following: a non-magnetic substrate, a soft magnetic back-lining layer comprising an alloy of CoZrNb, a soft magnetic underlayer comprising an alloy of NiFeSi, an intermediate layer comprising Ru, a magnetic recording layer, a protective film, and a liquid lubricating layer that are serially laminated on the non-magnetic substrate; wherein a thermal treatment process is executed immediately after film formation of the magnetic recording layer.

To constitute the non-magnetic substrate, this example uses a piece of chemically-reinforced glass substrate provided with a smoothened upper surface (for example, N-10 glass substrate, a product of Hoya Glass Manufacturing Co., Ltd., Tokyo, Japan). After a washing process is performed, the non-magnetic substrate is disposed in a sputtering device (not shown). Then, through the application of a target composed of an alloy comprising 87 at % Co, 5 at % Zr, and 8 at % Nb, an amorphous soft magnetic back-lining layer comprising an alloy of CoZrNb is formed with a film thickness of 200 nm. Next, a permalloy target comprising 82 at % Ni, 12 at % Fe, and 6 at % Si is applied to form an underlayer comprising an alloy of NiFeSi with a film thickness of 11 nm.

Next, by applying a Ru target in an atmosphere containing Ar gas at a pressure of 4.0 Pa, a Ru intermediate layer is formed with a film thickness of 10 nm. In succession, the application of an 88 mol % target comprising 79 at % Co, 7 at % Cr, 14 at % Pt, and 12 mol % SiO$_2$ forms a magnetic recording medium comprising an alloy of CoCrPt—SiO$_2$ with a film thickness of 10 nm. Next, the magnetic recording medium is disposed in a heater chamber, and the magnetic recording medium is then thermally processed under a vacuum corresponding to $1.3 \times 10^{-4}$ Pa by raising the inner temperature to 243° C. within 14 seconds.

Finally, the application of a carbon target forms a protective film comprising carbon with a film thickness of 10 nm, and the protective film is then extracted from a vacuum device (not shown). Except for the process of forming the above Ru intermediate layer and providing thermal treatment with a heater, all the films for the above-mentioned layers are processed by the DC magnetron sputtering method in an atmosphere containing 0.67 Pa of Ar gas pressure. Next, by a dipping method, a liquid lubricating layer comprising perfluoropolyether is formed with a film thickness of 2 nm. According to these steps, a perpendicular magnetic recording medium is prepared. In order to check the difference in the characteristics of the perpendicular magnetic recording medium when the heating temperature is varied, a number of additional perpendicular magnetic recording media is prepared and individually exposed to peak temperatures of 160° C., 188° C., 215° C., 270° C., and 298° C. by heating with a heater.

EXAMPLE 2

Except for the processes for forming a seed layer comprising Ta with a film thickness of 3 nm by the DC magnetron sputtering method following the film formation of a soft magnetic back-lining layer comprising an alloy of CoZrNb, another perpendicular magnetic recording layer is produced based on serial processes identical to those implemented in Example 1.

COMPARATIVE EXAMPLE 1

Except for the processes for forming a protective film comprising carbon without executing a heating process immediately after the film formation of a magnetic recording layer, a perpendicular magnetic recording medium is produced by applying serial processes identical to those implemented in Example 1.

Next, based on the Magnet-optical Kerr Effect, the actual coercive force Hc of the perpendicular magnetic recording medium newly produced as described above is measured. The result of measuring the coercive force of this perpendicular magnetic recording medium generated from the above Examples 1 and 2 and Comparative Example 1 is designated in an analytical graphic chart shown in FIG. 2.

Figure 2:
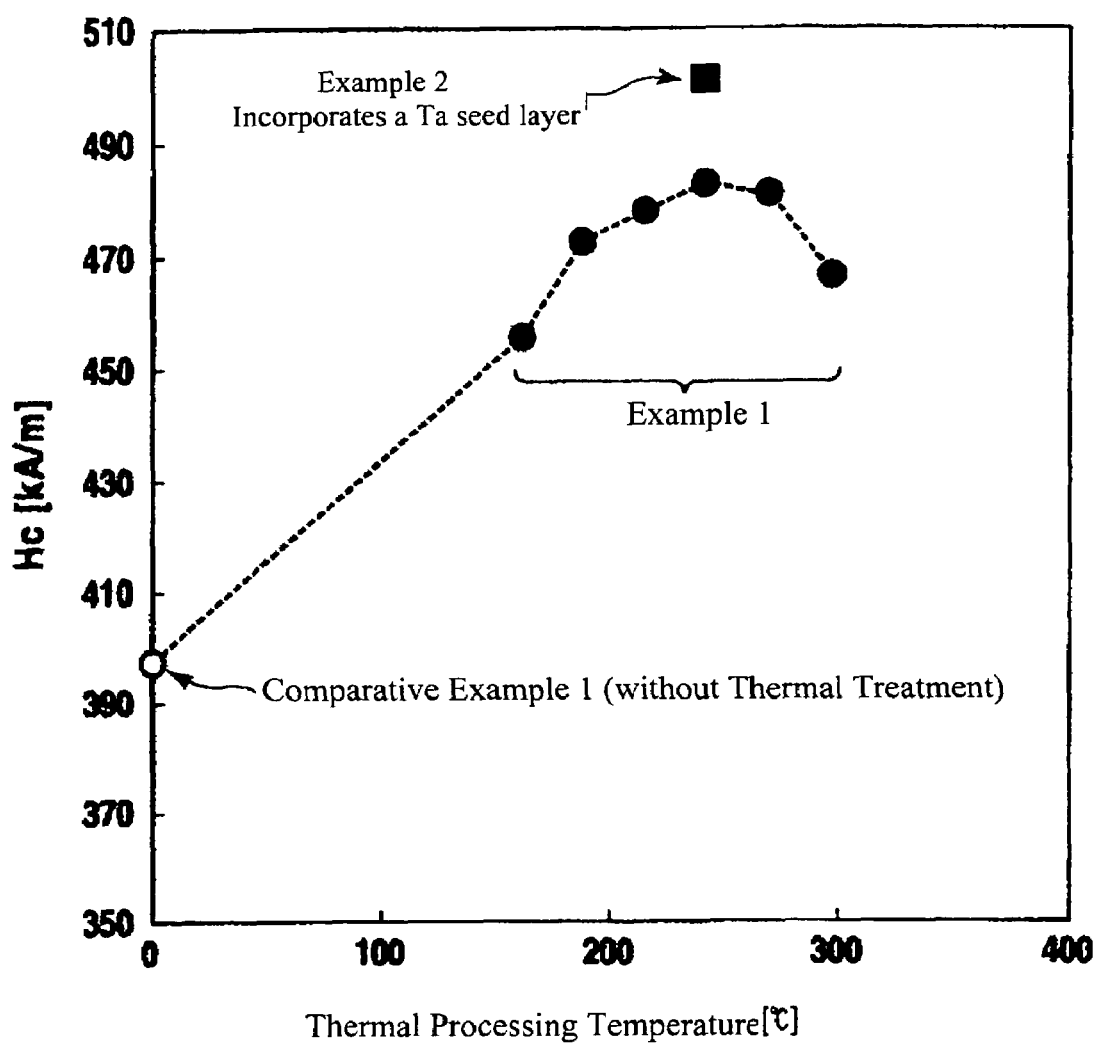
FIG. 2 is an analytical graphic chart showing the physical characteristics in terms of coercive force Hc of the recording media related to Examples 1 and 2 of the present invention and Comparative Example 1.

As shown in FIG. 2, a comparison of Example 1, in which a thermal treatment follows the film formation of the magnetic recording layer, with Comparative Example 1, in which no thermal treatment follows film formation of the magnetic recording layer, demonstrates that the actual rating of the coercive force Hc was enhanced by a maximum of approximately 20% by addition of a thermal treatment. However, as soon as the actual temperature of the thermal treatment following film formation of the magnetic layer exceeds 243° C., the coercive force Hc may begin to decline. Thus, when the temperature used in thermal treatment is too high, magnetic characteristics decline.

Figure 3:
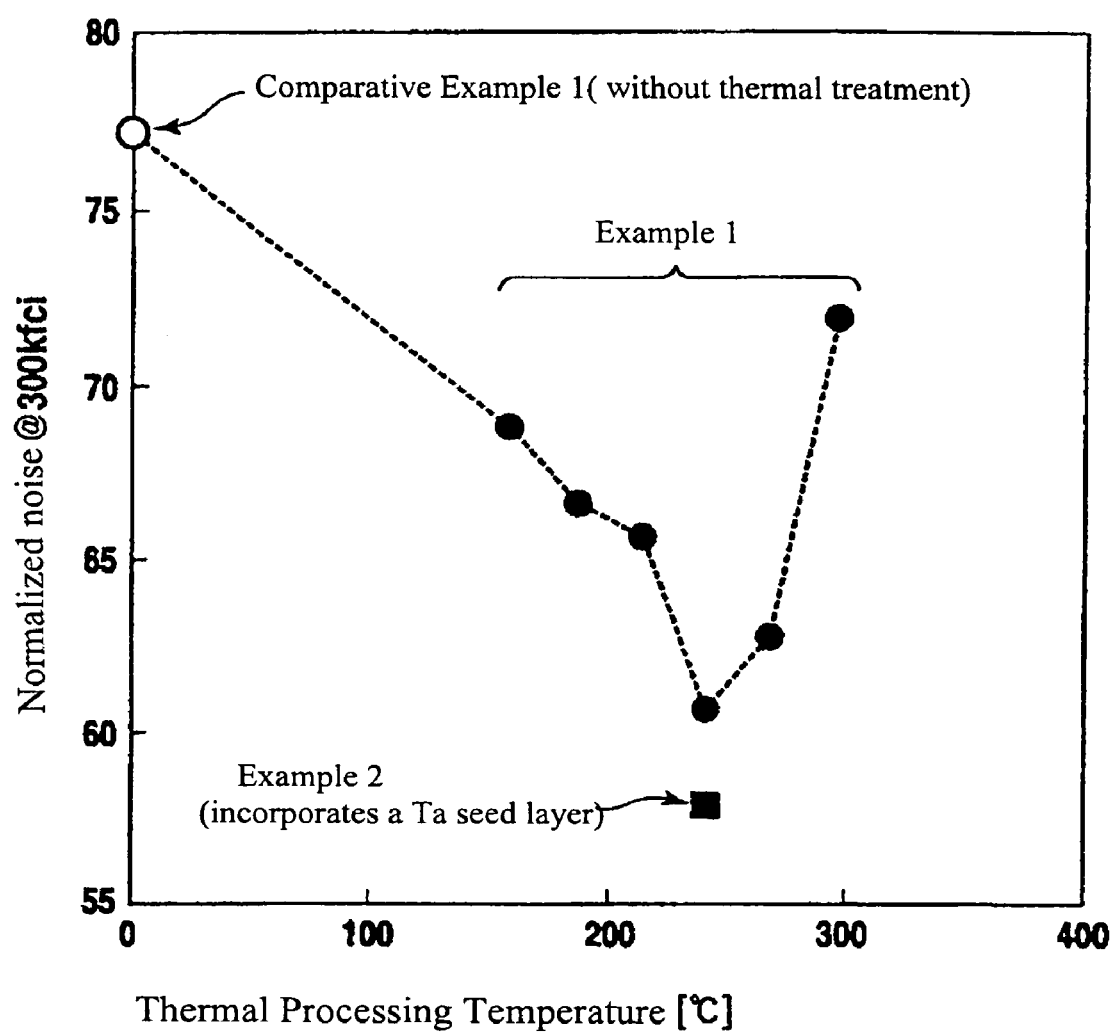
FIG. 3 is an analytical graphic chart showing the physical characteristics in terms of normalized noise level of the recording media related to Examples 1 and 2 of the present invention and Comparative Example 1.
Figure 4:
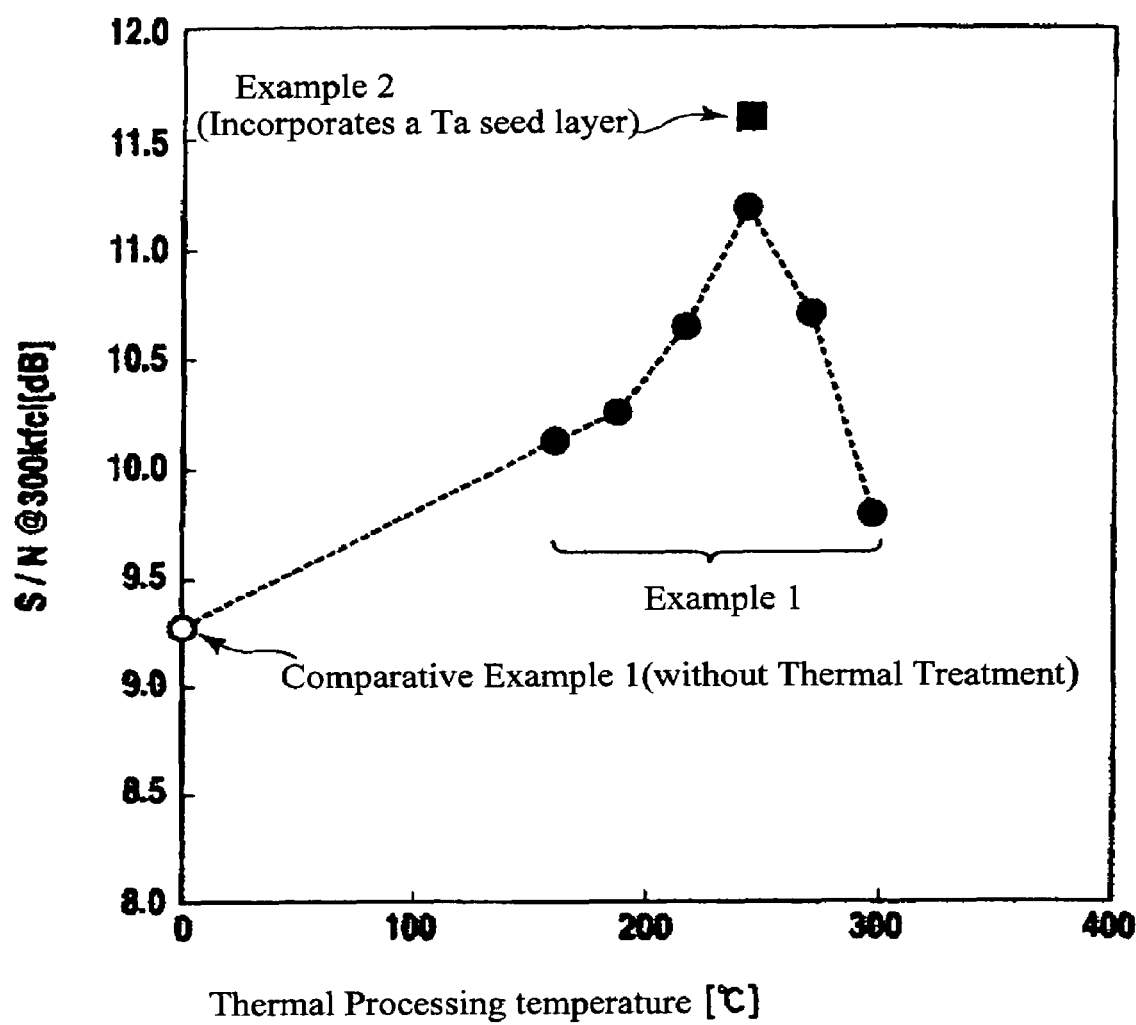
FIG. 4 is an analytical graphic chart showing the physical characteristics in terms of the S/N ratio of the recording media related to Examples 1 and 2 of the present invention and Comparative Example 1.

Next, serial analytical processes were executed using a read/write tester and varying recording density to measure the noise component generated in the magnetic recording medium, to measure the signal-to-noise (S/N) ratio of the output reproduction signal, and to measure the decay characteristics of the output reproduction signal, and then the resultant ratings were evaluated in comparison with each other. FIG. 3 graphically represents the ratings of the normalized noise components in the tested magnetic recording media at the recording density of 300-kFCI detected via the processes executed in Examples 1 and 2 and Comparative Example 1. FIG. 4 graphically represents the S/N ratio ratings of the tested magnetic recording medium at the recording density of 300-kFCI generated via the processes executed in Examples 1 and 2 and Comparative Example 1.

As is clear from FIG. 3 and FIG. 4, in the magnetic recording medium produced as in Example 1, the noise component is minimized after thermal treatment at 243° C., whereas the S/N ratio is maximized. In terms of actual ratings, compared to the conventional magnetic recording medium cited in Comparative Example 1, the amount of noise component detected in the above magnetic recording medium decreases by 22%, whereas the value of the S/N ratio rises by 1.9 dB. When the temperature applied to the thermal treatment is too high, it was found that the noise component conversely increased in the magnetic recording medium, reducing the S/N ratio. At the moment at which the noise component is minimized to cause the S/N ratio to be maximized conversely, the actual temperature of the thermal treatment coincides with the peak value of the coercive force Hc shown in FIG. 2.

Figure 5:
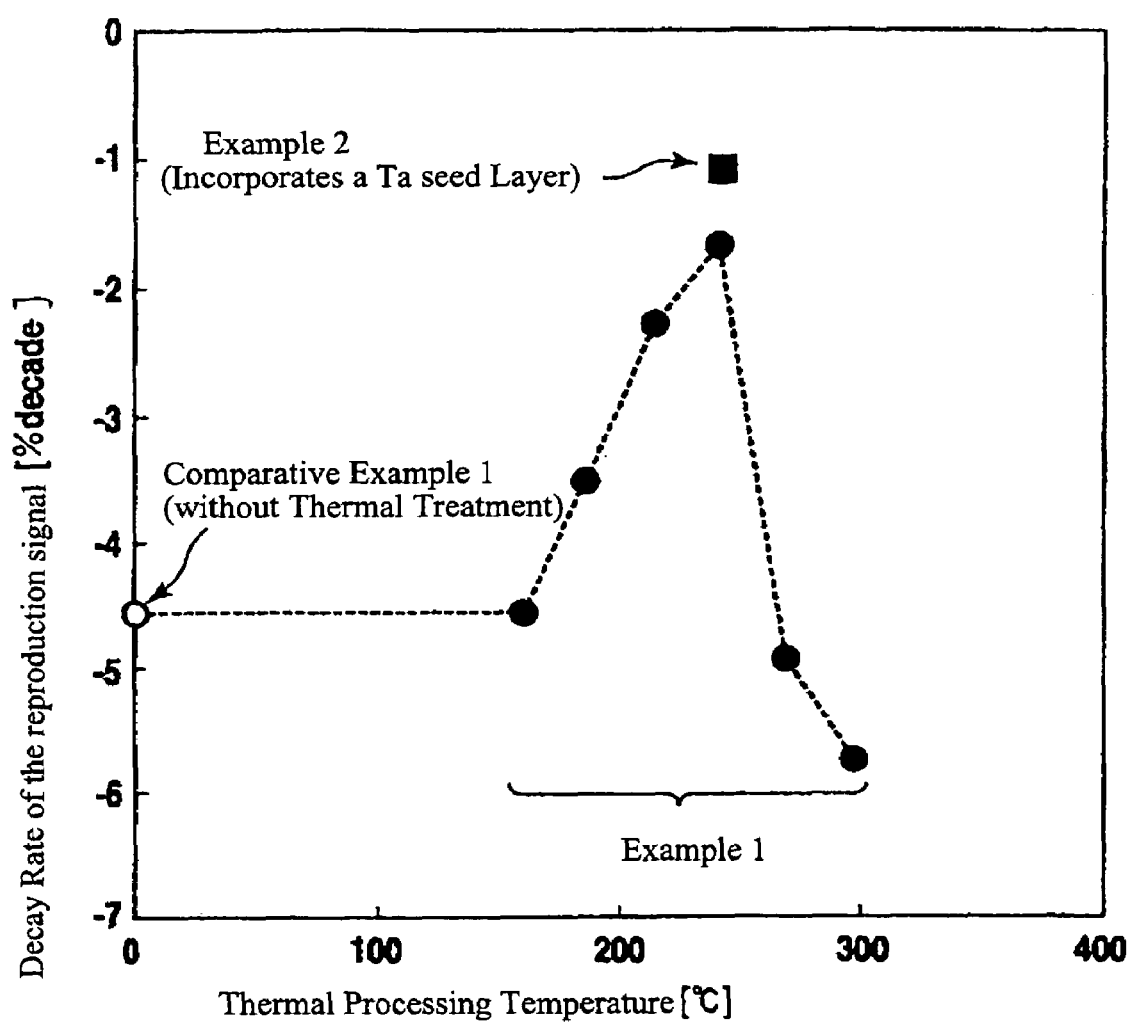
FIG. 5 is an analytical graphic chart showing the physical characteristics in terms of the decay characteristics of the output reproduction signal related to Examples 1 and 2 of the present invention and Comparative Example 1.

FIG. 5 graphically represents the decay characteristics of the output reproduction signal at the recording density of 25-kFCI of the magnetic recording media generated via the processes executed in Examples 1 and 2 and Comparative Example 1. FIG. 5 shows that the decay rate of the output reproduction signal is lowered by the effects of thermal treatment. It was confirmed that, when the heating temperature is exactly 243° C., the actual decay rate of the output reproduction signal decreases to one-third of the decay rate generated by a conventional magnetic recording medium, processed as in Comparative Example 1. A negligible decay rate in the output reproduction signal in turn indicates that the thermal stability of the magnetic recording medium remains high.

Further, as can be seen from the charts shown in FIG. 2, FIG. 3, FIG. 4, and FIG. 5, in the magnetic recording medium provided with a seed layer comprising a Ta component produced via the processes executed in Example 2, the coercive force Hc, the noise component, the S/N ratio, and the decay rate of output reproduction signal are each raised beyond that achieved by the magnetic recording medium processed in Example 1.

As described above, the application of a thermal treatment immediately after the film formation of the magnetic recording layer improves the magnetic characteristics of the recording medium, and significantly reduces the noise component in the magnetic recording medium, thereby resulting in improved thermal stability. Moreover, the addition of a Ta seed layer as in Example 2 further improves the practical effects. However, inasmuch as various performances may be degraded when the heating temperature exceeds 243° C., it was also found that the application of excessive thermal treatment can conversely degrade the performances of the magnetic recording medium.

EXAMPLE 3

This example of the present invention relates to a novel perpendicular magnetic recording medium comprising the following: a non-magnetic substrate, a soft magnetic back-lining layer essentially comprising an alloy of CoZrNb, a seed layer comprising NiAl, an underlayer essentially comprising an alloy of NiFeNbB, an intermediate layer comprising Ru, a magnetic recording layer, a protective film, and a liquid lubricating layer that are serially laminated on the non-magnetic substrate, wherein thermal treatment is necessarily executed immediately after formation of the protective film made from carbon.

A chemically-reinforced glass substrate having a smooth surface (for example, an N-10 glass substrate, a product of Hoya Glass Manufacturing Co., Ltd., Tokyo, Japan) is used to constitute the above non-magnetic substrate. After a washing process, the non-magnetic substrate is stored in a sputtering device. An amorphous soft magnetic back-lining layer comprising CoZrNb is then formed with a film thickness of 200 nm by applying a target comprising 87 at % Co, 5 at % Zr, and 8 at % Nb. Next, a seed layer comprising NiAl was formed with a film thickness of 3 nm by applying a target comprising an alloy of $Ni_3Al$. Next, an underlayer comprising NiFeNbB was formed with a film thickness of 20 nm by applying a target comprising a permalloy-series alloy consisting of 79 at % Ni, 12 at % Fe, and 3 at % Nb.

Next, a Ru intermediate layer was formed with a film thickness of 10 nm in an atmosphere containing 4.0 Pa of argon gas pressure by applying a target comprising Ru. Next, a magnetic recording layer comprising $CoCrPt—SiO_2$ was formed with a film thickness of 10 nm by applying a target comprising 88 mol % (comprising 79 at % Co, 7 at % Cr, and 14 at % Pt) and 12 mol % $SiO_2$. Next, a protective film comprising carbon was formed with a film thickness of 10 nm by applying a target comprising carbon.

Finally, the processed layer films were stored in a heating chamber. The stored layer films were exposed to a vacuum at $1.3 \times 10^{-4}$ Pa, in which the temperature was raised to 215° C. within 14 seconds. The processed layer films were then extracted from the vacuum device. The processes of film formation for these component layers, except for the Ru intermediate layer and the thermal process performed using a heater, were executed solely by the DC magnetron sputtering method under argon gas pressure of 0.67 Pa. Next, a liquid lubricating layer comprising perfluoropolyether was formed with a film thickness of 2 nm by a dipping method, before a novel perpendicular magnetic recording medium was eventually formed.

COMPARATIVE EXAMPLE 2

Except for the process for extracting a carbon-made protective film formed without thermal treatment using a heater following formation of the protective film, a perpendicular magnetic recording medium was produced by applying serial processes identical to those performed in Example 3.

For the samples of the perpendicular magnetic recording media produced via the above-described serial processes, the coercive force Hc was measured using a Kerr looper, and the noise component, S/N (signal-to-noise) ratio and the decay ratio of the reproduced signal were measured using a read-write tester. Table 1 shows the coercive force Hc of the magnetic recording media produced as in Example 3 and Comparative Example 2, the actual noise component present in the magnetic recording media at the reading density of 300 KFCI, the S/N ratio, and the actual decay rate of the output reproduction signal measured at the recording density of 25 kFCI.

Table 1 shows that the magnetic recording medium produced as in Example 3 has secured substantial coercive force Hc exceeding that secured in Comparative Example 2. Further, it was also confirmed in regard to the read-write performances that the magnetic recording medium produced as in Example 3 caused the noise component to decrease therein, enhancing S/N ratio. It was also confirmed that the decay rate of the output reproduction signal was reduced to a level corresponding to one-third of the rating for the magnetic recording medium produced as in Comparative Example 2, thereby proving that the thermal stability has been improved significantly.

As described above, notwithstanding that the magnetic recording medium produced as in Example 3 according to the present invention was exposed to a short-term low-temperature thermal treatment at a maximum of 215° C. for 14 seconds, it was confirmed that the magnetic recording medium produced as in Example 3 surpassed all conventional magnetic recording media in all aspects in terms of magnetic characteristics, read-write performances, and thermal stability.

The results of comparative evaluations of the magnetic characteristics and read-write performances related to Example 3 and Comparative Example 2 are shown in the following Table 1.

TABLE 1

|  | Example 3 | Comparative Example 2 |
|---|---|---|
| Coercive force Hc [kA/m] | 496 | 465 |
| Medium noise (300 kFCI) [μVrms/mVp-p] | 57.4 | 68.8 |
| S/N Ratio (300 kFCI) [dB] | 11.37 | 10.11 |
| Decay ratio of the output signal (25 kFCI) [%/decade] | −1.36 | −3.94 |

EXAMPLE 4

This example relates to a perpendicular magnetic recording medium comprising a non-magnetic substrate, a soft magnetic back-lining layer composed of a CoZrNb composite, a seed layer composed of a TaW composite, an underlayer composed of a NiFeSi composite, an intermediate layer solely composed of Ru, a magnetic recording layer, a protective film, and a liquid lubricating layer, which are serially laminated on the above-mentioned non-magnetic substrate, wherein a thermal treatment is applied to the above-mentioned laminated structure immediately after formation of the above-mentioned protective film consisting solely of carbon.

The above-mentioned non-magnetic substrate consists of a chemically-reinforced glass substrate (model N-10 glass substrate, a product of HOYA CORPORATION, Tokyo Japan, for example) with a smooth surface. After a washing process was performed, the non-magnetic substrate was placed inside a sputtering device, and then, using a target consisting of an 87 at % Co-5 at % Zr-8 at % Nb composite, an amorphous soft-magnetic lining layer consisting of a CoZrNb composite was formed to a thickness of 200 nm. Next, using a target consisting of a 60 at % Ta-40 at % W composite, a TaW seed layer was formed to a thickness of 3 nm. Then, using a target consisting of permalloy (alloy) comprising an 82 at % Ni-12 at % Fe-6 at % Si composite, an underlayer consisting of a NiFeSi composite was formed to a thickness of 11 nm. Further, using a Ru target, an intermediate layer solely comprising Ru was formed to a thickness of 10 nm in an atmosphere with argon gas pressure of 4.0 Pa. Further, using a target comprising a 90 mol % (64 at % Co-16 at % Cr-20 at % Pt)–10 mol % ($SiO_2$) composite, a magnetic recording layer consisting of a $CoCrPt$—$SiO_2$ composite was formed to a thickness of 9 nm. Next, using a carbon target, a protective film consisting solely of carbon was formed to a thickness of 10 nm. In the last production stage, the above-mentioned laminated structure was placed inside a heating chamber and heated to 243° C. within 14 seconds in a vacuum of $1.3 \times 10^{-4}$ Pa, before being extracted from the vacuum unit. Except for the formation of the intermediate film solely comprising Ru and the thermal treatment, all processes for the formation of the above composite films were carried out by a DC magnetron sputtering method in an atmosphere with argon gas pressure of 0.67 Pa. Next, a liquefied lubricating layer composed of perfluoropolyether was formed to 2 nm via a dipping process to complete the perpendicular magnetic recording medium according to the present invention.

COMPARATIVE EXAMPLE 3

The perpendicular magnetic recording medium of Comparative Example 3 was produced by the same steps as for preceding Example 4, except that no thermal treatment was employed in the vacuum unit immediately after formation of the carbon-based protective film.

For the samples of the perpendicular magnetic recording media produced via the above-described serial processes, the coercive force Hc was measured using a Kerr looper, and the noise component, S/N (signal-to-noise) ratio and the decay ratio of the reproduced signal were measured using a read-write tester. These measurement processes were performed through the use of a Single Pole Type/GMR head at a disk revolving speed of 5400 rpm. Table 2 shows the coercive force Hc, noise component and S/N ratio measured at 370 kFCI, and the decay ratio of the reproduced signal measured at 30 KFCI, for the media of the above Example 4 and Comparative Example 3.

Unlike in the case of Comparative Example 3, according to the result obtained in Example 4, it is understood that the value of the coercive force Hc has been improved significantly as a result of the thermal treatment conducted immediately after formation of the carbon-based protective film. In terms of the read-write performance, unlike in the case of Comparative Example 3, the results from the execution of Example 4 showed that the noise component of the recording media and the decay ratio of the reproduced signal were significantly decreased (by nearly one half in terms of the decrease in the decay ratio of the reproduced signal), and also showed that the S/N ratio was improved by +0.8 dB. These results indicate that both the recording density and the thermal stability of the recording medium were enhanced through the thermal treatment executed immediately after formation of the carbon-based protective film.

Results from the comparative evaluations of the magnetic characteristics and read-write performance between Example 4 and Comparative Example 3 are shown in the following Table 2.

TABLE 2

| | Example 4 | Comparative Example 3 |
|---|---|---|
| Coercive force Hc [kA/m] | 566 | 486 |
| Medium noise (370 kFCI) [$\mu V_{rms}/mV_{p-p}$] | 28.3 | 29.0 |
| S/N Ratio (370 kFCI) [dB] | 17.91 | 17.09 |
| Decay ratio of the output signal (30 kFCI) [%/decade] | −1.15 | −2.18 |

Thus, a perpendicular magnetic recording medium and a method for its manufacture have been described according to the present invention. Many modifications and variations may be made within the scope of the invention.

What is claimed is:

1. A method of manufacturing a perpendicular magnetic recording medium comprising, in order:

forming a soft magnetic back-lining layer on a non-magnetic substrate;

forming an intermediate layer comprising Ru or Ru-based alloy on said soft magnetic back-lining layer;

forming a magnetic recording layer incorporating a granular structure on said intermediate layer, wherein said granular structure is formed by the dispersion of magnetic grains in a matrix of non-magnetic oxide or non-magnetic nitride;

forming a protective film on said magnetic recording layer; and forming a liquid lubricating layer on said protective film;

wherein a thermal treatment is performed in an atmosphere ranging in temperature from about 200° C. to about 250° C. for no longer than about 60 seconds under a vacuum higher than about 0.1 Pa either (i) after forming said magnetic recording layer and before forming said protective film, or (ii) after forming said protective film and before the forming said liquid lubricating layer.

2. A method of manufacturing a perpendicular magnetic recording medium according to claim 1, wherein said thermal treatment is executed for a duration ranging from about one second to about 15 seconds.

3. A method of manufacturing a perpendicular magnetic recording medium according to claim 1, wherein a seed layer is formed on said soft magnetic back-lining layer by applying a material selected from any type among Ta, Zr, Ni$_3$Al, and a Ta-based alloy, and then said intermediate layer is formed after executing said seed-layer forming process.

4. A method of manufacturing a perpendicular magnetic recording medium according to claim 2, wherein a seed layer is formed on said soft magnetic back-lining layer by applying a material selected from any type among Ta, Zr, Ni$_3$Al, and a Ta-based alloy, and then said intermediate layer is formed after executing said seed-layer forming process.

5. A method of manufacturing a perpendicular magnetic recording medium according to claim 3, wherein an underlayer comprising a material made from soft magnetic permalloy is formed on said seed layer; and then said intermediate layer is formed after the execution of said process for forming said underlayer.

6. A method of manufacturing a perpendicular magnetic recording medium according to claim 4, wherein an underlayer comprising a material made from soft magnetic permalloy is formed on said seed layer; and then said intermediate layer is formed after the execution of said process for forming said underlayer.

7. A method of manufacturing a perpendicular magnetic recording medium according to claim 1, wherein an underlayer comprising a material made from soft magnetic permalloy is formed on said soft magnetic back-lining layer, and then said intermediate layer is formed after the execution of said process for forming said underlayer.

8. A method of manufacturing a perpendicular magnetic recording medium according to claim 2, wherein an underlayer comprising a material made from soft magnetic permalloy is formed on said soft magnetic back-lining layer, and then said intermediate layer is formed after the execution of said process for forming said underlayer.

9. A method of manufacturing a perpendicular magnetic recording medium according to claim 3, wherein the seed layer is formed using a Ta-based alloy in which a material selected from the group consisting of Cr, Mo, and W is added in an amount of about 1 at % to about 60 at %.

10. A method of manufacturing a perpendicular magnetic recording medium according to claim 4, wherein the seed layer is formed using a Ta-based alloy in which a material selected from the group consisting of Cr, Mo, and W is added in an amount of about 1 at % to about 60 at %.

* * * * *